(No Model.) 2 Sheets—Sheet 2.
C. P. ALLEN.
APPARATUS FOR PURIFYING AND AERATING WATER.
No. 603,990. Patented May 10, 1898.
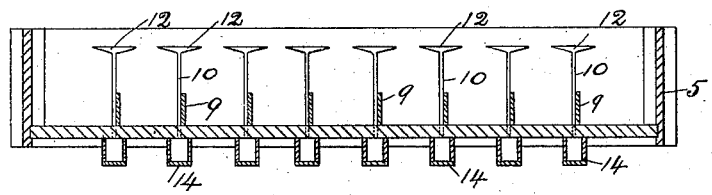
FIG 4.
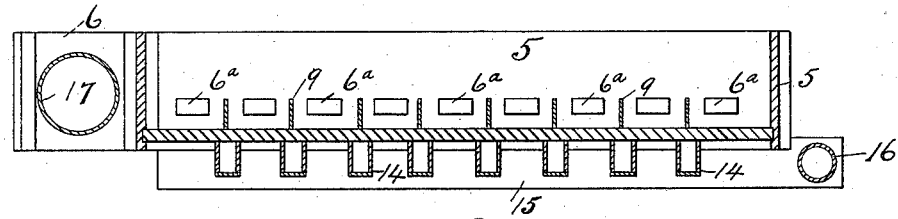
FIG 3.
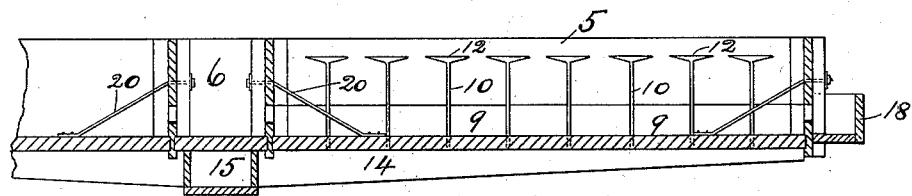
FIG 2.
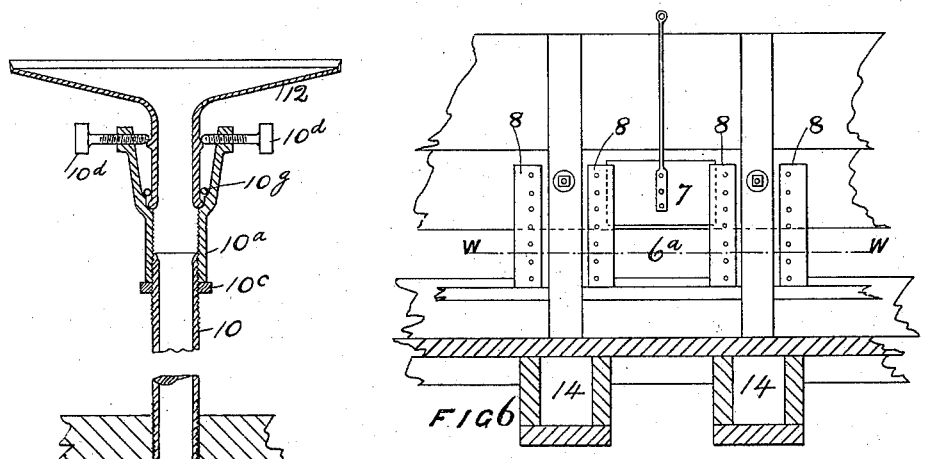
FIG 5.   FIG 6.
FIG 7.
Witnesses
John J Huddart
Edith Himsworth
Inventor
C. P. ALLEN
By his Attorney

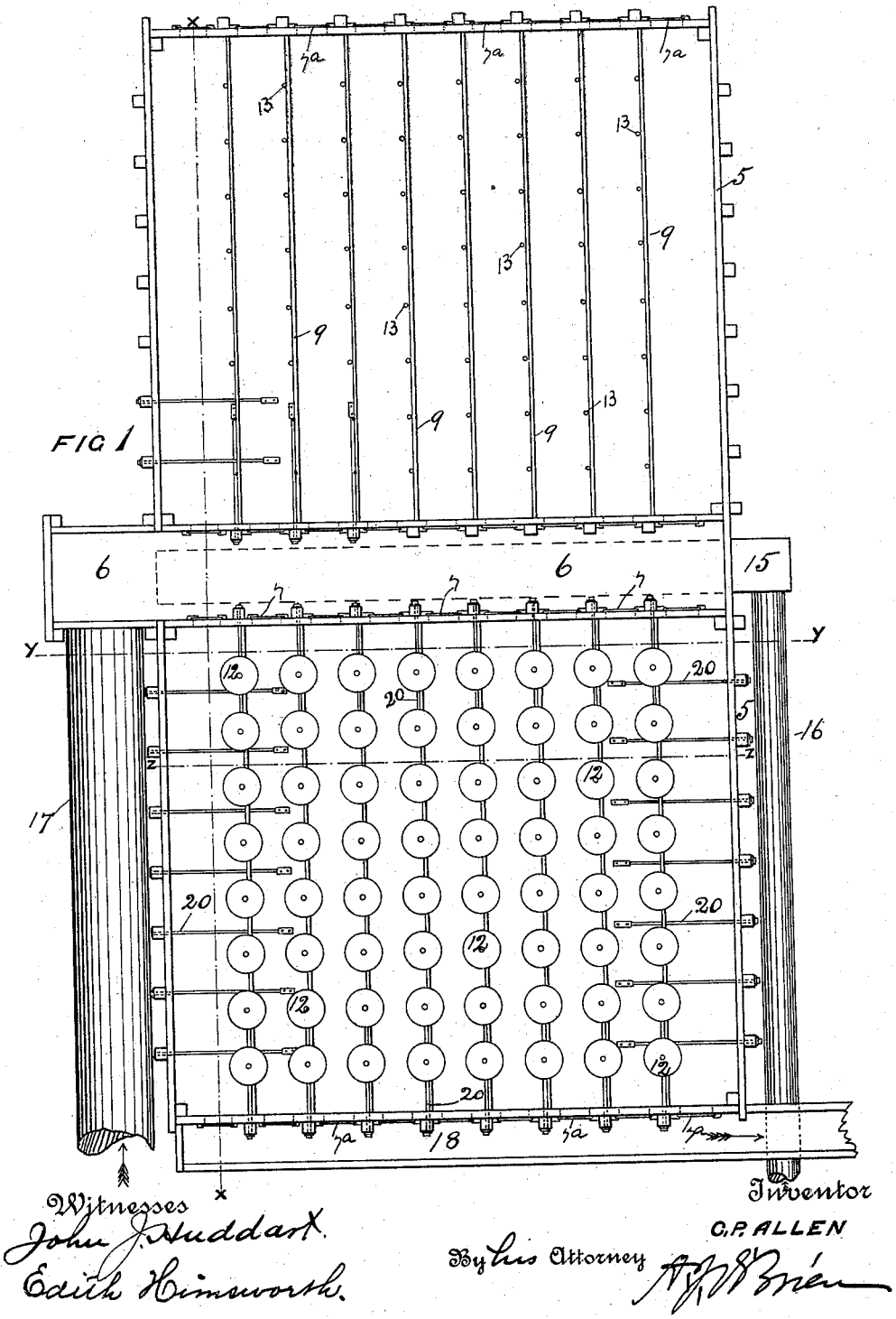

UNITED STATES PATENT OFFICE.

CHARLES P. ALLEN, OF DENVER, COLORADO.

APPARATUS FOR PURIFYING AND AERATING WATER.

SPECIFICATION forming part of Letters Patent No. 603,990, dated May 10, 1898.

Application filed October 16, 1897. Serial No. 655,446. (No model.)

*To all whom it may concern:*

Be it known that I, CHARLES P. ALLEN, a citizen of the United States of America, residing at Denver, in the county of Arapahoe and State of Colorado, have invented certain new and useful Improvements in an Apparatus for Settling and Aerating Water; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved apparatus for settling and aerating water preparatory to filtration for domestic and other use.

My improved apparatus is specially intended for use in connection with and as a part of systems for supplying cities with water or for supplying water under any circumstances where purity is a desideratum.

My object is to provide an apparatus of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a combination top or plan view of the apparatus, showing two settling tanks or boxes fed from a common flume intermediately located. In the lower half of this view the aerating-skimmers are shown, while in the upper half of the view the skimmers are removed. Fig. 2 is a fragmentary vertical section taken on the line $x\,x$, Fig. 1. Fig. 3 is a section taken on the line $y\,y$, Fig. 1. Fig. 4 is a section taken on the line $z\,z$, Fig. 1. Fig. 5 is a vertical section taken through one of the skimmers, the hollow stem being partly broken away and the parts shown on a larger scale. Fig. 6 is a fragmentary elevation of one of the tanks or boxes viewed from the flume side and shown on a larger scale, the bottom of the flume and the conduits underneath the boxes being shown in section. Fig. 7 is a section taken on the line $w\,w$, Fig. 6, the gate being closed.

Similar reference characters indicating corresponding parts in the views; let the numeral 5 designate the settling boxes, tanks, or reservoirs, which may be of any convenient size and are preferably arranged in pairs. (See Fig. 1.) The two boxes of each pair are located on opposite sides of a common flume in the sides of which are formed openings $6^a$, through which the water passes to the boxes 5. These openings $6^a$ are controlled by gates 7, whose vertical edges move in guideways formed by angle-plates 8, secured to the wall of the flume on opposite sides of the opening $6^a$. Each settling-box is provided with partitions 9, extending at right angles to the direction of the flume. The function of these partitions is to facilitate the cleaning or flushing of the boxes, as hereinafter more fully described.

In each settling-box is located a series of tubes 10, having relatively large funnel-shaped or conical mouths 12. These parts 10 and 12, taken together, will for convenience be termed "skimmers." The tubes 10 are screwed into apertures 13, formed in the bottom of each box, tank, or reservoir and communicate with conduits 14, formed underneath the box and leading to a common conduit 15, from which the water passes by way of a pipe 16 to the filtering-tanks. (Not shown.) I prefer to construct these skimmers as shown in Fig. 5, in which the mouth 12 is adjustable in a keeper $10^a$, screwed upon the upper threaded extremity of the tube 10 and held in place by a lock-nut $10^c$. The upper extremity of this keeper is provided with a circular enlargement to receive the depending reduced portion of the mouth 12, which may be adjusted to occupy a horizontal position even though the tube 10 may not be exactly perpendicular. The mouth 12 is locked in any desired position of adjustment by means of bolts $10^d$, screwed into threaded apertures formed in the top of the keeper. A packing-ring $10^g$ is placed between the mouth 12 and the keeper to form a water-tight joint and prevent any water from entering the tubes 10 except by way of the mouths 12. These "skimmers" are so called because they may be said to skim off the thin layer or stratum of water at the top of the tank or box, the said top stratum of water having been deprived of all impurities of such a nature or having such specific gravity that they will settle.

In constructing the apparatus set forth in this application my object has been to place the water under the conditions or circumstances which are most favorable for settling or depriving it of its impurities by a process of sedimentation. Hence the thin top layer of comparatively pure water is constantly passing over the outer edge of the skimmer's mouth 12 and running down into the tubular stem 10, and thence into the conduit 14 underneath. In addition to skimming off the pure water these skimmers by virtue of their peculiar construction perform another important function—namely, the aeration of the water. It is evident that the water running down the curved or inclined sides of the mouths 12 will have a tendency to produce a partial vacuum in the reduced depending portion of this mouth and the tube 10, with the result that the vertical tubes become suction-pipes, which are constantly drawing or sucking the air downward, and through the action of the descending water forcing the air into the water, which is carried off by the conduits 14. Thus the water becomes thoroughly aerated, which is a desideratum in systems which supply water for domestic use.

As shown in the drawings, the water which is originally taken from the natural source of supply enters the flume 6 by way of an inlet-pipe 17 and passes thence into the boxes, tanks, or reservoirs 5 by way of the openings 6ª in the flume sides, the gates 7 being opened for the purpose. As these boxes fill with water sedimentation is constantly going on under the most favorable conditions, as there is present no current or other agitating or disturbing influence having a tendency to arrest sedimentation or maintain the solids in a state of suspension. When the water rises in these boxes sufficiently high, the pure top stratum flows into the skimmer-mouths 12 and thence into the conduits 14, the conduit 15, and the outlet-pipe 16, as heretofore explained. After this settling or sedimentation process has been going on for a considerable time the sediment or settlings accumulate in the bottom of the boxes to such a degree as to require cleaning or flushing or at least to make the same highly desirable. In this case the inlet-gates 7 are closed and one or more of the outlet-gates 7ª opened. These outlet-gates are similar in construction and operation to the inlet-gates shown in Figs. 6 and 7, and are located at the opposite side of the tank or box 5. After the water has been drawn off from the box 5 until it is on a level with the partitions 9 the gates 7 and 7ª are both opened and a swift stream of water passed through the comparatively narrow channels formed by the partitions 9 until the tank or box is thoroughly flushed and cleansed of all accumulated impurities. This flushing-water passes into a trough 18, located alongside the box adjacent the outlet ports or openings. This waste water is discharged from the trough at any convenient point.

The boxes, tanks, or reservoirs 5 may be of any desired shape, size, or dimensions adapted to produce the conditions and results heretofore explained. It is also evident that instead of the separate conduits 14 a single reservoir may be formed under the boxes 5, from which the water may be conducted to the filter-tanks, or the filter-tanks may, if desired, be arranged directly beneath the boxes 5, so that the water from the skimmers may pass directly thereinto. Hence it must be understood that I do not limit the invention to the specific construction shown and described, as I am aware that many different forms may be employed without departing from the spirit of the invention.

Having thus described my invention, what I claim is—

1. In an apparatus for settling and aerating water, the combination of a suitable tank or box for receiving the water, a flume having openings to allow the water to enter the box, gates controlling said openings, and one or more upright tubes or conduits whose lower extremities are inserted in apertures formed in the bottom of the box, the upper extremities of said tubes or conduits having relatively large mouths into which the top stratum of water is constantly flowing when the apparatus is in use.

2. In a water-settling apparatus, the combination of a suitable box or tank, a flume having openings to allow the water to enter the tank, partitions forming flushing-channels in the bottom of the tank which is provided with one or more outlets for the flushing-water, and suitable upright open-ended conduits attached to the tank and adapted to receive the water from the top of the tank only, which water escapes from the tank by way of said conduits.

3. The combination with a suitable settling-tank, of one or more aerating-conduits each comprising a tube, a keeper secured to the top of the tube, a relatively large top having a reduced lower part engaging the keeper, set-bolts inserted in threaded apertures in the keeper for locking the said top in any desired position of adjustment, and a packing-ring for forming a water-tight joint between the keeper and the enlarged top of the device.

4. In a settling and aerating apparatus, the combination of a suitable box or tank, a flume having openings to allow the water to enter the tank, gates controlling said openings, partitions located in the tank and forming flushing-channels in the lower part of the tank, the tank having openings for the escape of the flushing-water, gates controlling said openings, aerating-conduits comprising upright tubes, and relatively large mouths adapted to receive the top stratum of water, the lower extremities of said tubes engaging apertures formed in the bottom of the tank, and one or more conduits located underneath the tank for receiving the water from the skimmers.

5. In an apparatus for settling and aerating water, the combination with a suitable tank or box for receiving the water, a flume having an opening to allow the water to enter the box, means for controlling said opening, and one or more conduits whose lower extremities are inserted in apertures formed in the bottom of the box, the upper extremities of said conduits having relatively large mouths.

In testimony whereof I affix my signature in presence of two witnesses.

CHARLES P. ALLEN.

Witnesses:
W. A. BUTCHART,
W. S. ALLEN.